United States Patent [19]

Gillich

[11] 4,162,920

[45] Jul. 31, 1979

[54] LITHOGRAPHIC PLATE FINISHER

[75] Inventor: Thomas N. Gillich, Berkeley Heights, N.J.

[73] Assignee: American Hoechst Corporation, Somerville, N.J.

[21] Appl. No.: 833,943

[22] Filed: Sep. 16, 1977

Related U.S. Application Data

[63] Continuation of Ser. No. 682,327, May 3, 1976, abandoned.

[51] Int. Cl.[2] .................................................. C09K 3/00

[52] U.S. Cl. .................................... 106/14.5; 101/463; 101/465; 106/2; 106/5; 106/11; 106/213

[58] Field of Search ........................ 106/14.5, 2, 5, 11, 106/21, 25, 213; 101/463, 465

[56] References Cited

U.S. PATENT DOCUMENTS

| | | | |
|---|---|---|---|
| 2,413,320 | 12/1946 | Griffin et al. | 106/213 |
| 2,577,821 | 12/1951 | Smith et al. | 106/213 |
| 2,663,989 | 12/1953 | Schlatter et al. | 106/213 |
| 2,856,298 | 10/1958 | Watson | 106/11 |
| 3,372,050 | 3/1968 | Weber | 106/213 |
| 3,644,332 | 2/1972 | Mooth et al. | 106/213 |
| 3,902,959 | 9/1975 | DeMatte | 106/213 |

*Primary Examiner*—J. Ziegler

*Attorney, Agent, or Firm*—James E. Bryan

[57] ABSTRACT

A composition for finishing lithographic printing plates having an oil phase which preferentially adheres to the image areas and an aqueous phase which desensitizes the metal carrier and aids in maintaining its hydrophilic character upon storage.

9 Claims, No Drawings

LITHOGRAPHIC PLATE FINISHER

This is a continuation of application Ser. No. 682,327, filed May 3, 1976, now abandoned.

This invention relates to lithography. In a particular aspect it relates to finisher compositions for lithographic printing plates.

Light-sensitive polymers and polymer compositions have gained widespread use in the preparation of photomechanical images such as lithographic printing plates. Upon exposure to actinic radiation, the negative-acting polymer compositions are hardened or rendered less soluble in solvent developers, thus creating a differentiation between exposed and unexposed areas. Positive-acting polymer compositions are rendered soluble upon exposure to actinic radiation in solvent developers which are inadequately active to remove the unexposed polymer. This property of changing the solubility of polymer compositions with actinic light is utilized in preparing printing plates by coating a lithographic support with a layer of the light-sensitive polymer compositions together with other components such as indicator dyes, pigment, stabilizers, and the like, and exposing the plate to an imagewise pattern by actinic radiation, thereby creating soluble and insoluble areas on the coating. Negative-acting coatings become insoluble and positive-acting coatings become soluble when exposed to radiation. An image is developed on the plate by removing the soluble unexposed negative-acting coating or the solubilized exposed positive-acting coating by treatment of the plate with a solvent developer or solution.

The imaged plates will accept ink where the coating remains and reject ink where the coating has been removed by the action of the developer. The inked image will transfer the ink to a blanket on a press and to paper, thus producing copies of the image on other media. If, however, the image areas are contaminated with ink repellent substances, then a poor quality image will result when inking up the plate or transferring the ink to paper of other media.

To protect the non-image areas of the plate during storage, the platemaker conventionally applies a finisher to the plate and polishes the finisher with a cotton pad or a cloth wipe until it becomes dry. If the finisher is left on the plate in a streaky semi-dry state, the image areas frequently are contaminated with a hydrophilic colloid from the finisher and will accept ink poorly, if at all. This condition is often referred to as blinding. The usual remedy for a blinded image is to wash the plate with water or acidified solutions and dissolve away the hydrophilic contaminants on the image surface. This wash step is time consuming and frequently entails shutting down a press operation until the plates can be processed to print clean sharp images.

The time lost on a sheet-fed press is often substantial if several plates must be treated to make the image print sharp and clean. On web-fed presses, the operation entails many difficulties due to the limited space between press cylinders especially when both sides of the web are printed with multi-cylindered presses. To avoid fingerprints and other contaminants which may deposit onto the non-printing areas of the plate, the protective hydrophilic layer cannot be removed prior to mounting the plates on the press. It is advantageous if the hydrophilic layer can be removed by contacting the plate with the press dampening system prior to dropping the ink rollers.

Gum arabic commonly has been used to finish lithographic printng plates because of its hydrophilic properties. The low viscosity of gum solutions permits a high solids level in finisher solutions. Gum blinding, however, is often found on plates treated with gum arabic unless extreme care is used in finishing the plates. Synthetic gum solutions have been used to replace gum arabic. However, these are also the cause of image blinding. It is desirable that a finisher solution have less tendency to blind the image then conventionally used gum arabic or synthetic gum formulations. Such a finisher should be easily applied to lithographic printing plates and should be easily removable with a water rinse or by dropping the dampening rollers on a lithographic press. Such a finisher advantageously should maintain the image in an ink-acceptant condition while protecting the plate carrier from being contaminated upon storage or during handling.

It is an object of this invention to provide a composition that will desensitize the non-image areas of a lithographic printing plate while simultaneously conditioning the image areas of the plate to retain their ink-receptivity upon storage. It is another object of this invention to provide an emulsion type lithographic plate finisher which is easily applied to a plate with a cotton pad. It is another object of this invention to provide a lithographic plate finisher which can be readily removed with a water rinse or by contact with the dampening rollers of a lithographic press, thereby permitting fast rollup of the image and avoiding scum in the non-image areas of the plate.

In accordance with the present invention, there is provided an emulsion type plate finisher which protects a lithograhic printing plate for a storage period of several hours to several weeks and at the same time reduces the problems related to finishing plates. The emulsion type plate finisher comprises an image protecting agent in a solvent phase, and a hydrophilic desensitizing agent in a water phase. These two phases are made into a stable emulsion and used as such. The solvent phase comprises a hydrocarbon petroleum solvent solution of an oleophilic solvent-soluble surfactant, the latter being the image protecting agent. The aqueous phase comprises tapioca dextrin, a salt or salts, and water. Additionally, an emulsifying agent may be used to provide a stable emulsion of all components. The oleophilic solvent-soluble surfactant is present in the solvent phase in an amount from 0.02 to 2 percent by weight, with the balance a hydrocarbon petroleum solvent. Preferably, the surfactant is present in the range from 0.5 to 1.5 percent by weight, with the balance a hydrocarbon petroleum solvent. In the water phase, the tapioca dextrin is present in an amount of 0.5 to 30% by weight, preferably from 1 to 15% by weight. Salt, or salts, are present in the water phase from 0.5 to 20% by weight and preferably from 1 to 10%, with the balance water. Preferably, a pH range of 3 to 5 is maintained in the formulations of the present invention. The solvent phase may be from 1 to 20% by weight of the sum of the solvent phase and water phase; and, preferably, only 5 to 12% by weight.

Suitable solvents include hydrocarbon solvents, such as petroleum distillates, e.g. naphtha, Stoddard solvent, Mineral spirits, cyclic hydrocarbons such as benzene, xylene, and the like, as well as turpentine and the like.

Examples of suitable oleophilic solvent-soluble surfactants are complex phosphate esters of alkanols, GAFAC RE 610, a free acid of complex organic phosphate ester PE 510, a free acid of complex organic phosphate ester, and LO-529, a sodium salt of complex organic phosphate ester, all products of GAF Co. A preferred surfactant is Duponol O.S., a mixture of ⅓ of a diethyl cyclohexylamine salt of lauryl sulfate, and ⅔ oleyl alcohol a product of E. I. DuPont Igepal CO-210, a nonylphenoxy poly(ethyleneoxy)ethanol, is also suitable.

Dextrins are hydrolyzed starches. Tapioca dextrin is a preferred variety.

The salts which contribute to the hydrophilizing action are numerous. Suitable salts include sodium nitrate, sodium sulfate, calcium nitrate, magnesium nitrate, magnesium sulfate, sodium phosphate, ammonium phosphate, ammonium nitrate, ammonium sulfate, sodium acetate, potassium tartrate and the like, as long as they do not attack or have a severely corrosive effect upon aluminum plates. The pH may be adjusted with acids; a desirable range is 3–5.

In addition to the components enumerated above, one or more emulsifying agents may be used to provide a stable emulsion of all components. Numerous products of this type are suitable including the classes of nonionic and anionic surfactants. Specific examples of nonionic surfactants include ethoxylated decyl alcohols, polyethoxylated nonyl phenol, polyethoxylated isooctyl phenol, ethoxylated sorbitan monooleate, propoxylated fatty alcohols, ethoxylated or propoxylated polyhydroxy aliphatic compounds, and ethoxylated or propoxylated lanolin oil. Specific examples of anionic surfactants include sodium salts of alkanol sulfates such as sodium lauryl sulfate, and sodium salts of alkyl aryl sulfates and sulfonates, such as sodium alkyl naphthalene sulfate, sodium alkyl naphthalene sulfonate, and sodium alkyl benzene sulfonate. The emulsifying agents may be present in an amount in the range of 0.01 to 10 percent by weight, based on the weight of the solvent phase, preferably 0.1 to 2 percent by weight. Other suitable materials, such as dyes, pigments, anti-oxidants, solvents and fungicides also may be incorporated to enhance the function of stability of the emulsion finisher in solution, or after it has been dried down on the plate. Materials which serve as lubricants and evaporation rate controllers also may be added. Included among these are glycerol and other polyhydroxy compounds.

The image protecting agent preferentially adheres to the image areas of a lithographic printing plate and prevents the hydrophilic agents from adhering tenaciously to the image areas. The hydrophilic agent adheres to and protects the non-image areas of the plate from contaminants which would render the non-image areas ink receptive. Further, the novel property of the hydrophilic protecting layer is believed to be its rapid water absorption, compared to other prior art materials. However, the correctness of this belief is not an essential aspect of this invention. The lithographic plate finisher of the present invention can be used with lithograhic printing plates in general, and is particularly useful with lithographic printing plates prepared with light-sensitive polymeric compositions.

In practice, a suitable quantity of the finisher is swabbed onto a developed printing plate, and smoothed over the surface of the plate, after which the plate can be stored for periods up to several weeks.

A single application of the finisher is sufficient for most purposes. The tapioca dextrin, which is the preferred hydrophilic colloid employed in the present invention, is very water soluble, and low in viscosity so that solutions up to 20% by weight in water can be readily prepared.

Other additives which can be used in conjunction with the tapioca dextrin and acid phosphate salt are surfactants which improve the contact between the formulation and the hydrophilic substrate. Suitable wetting agents are glycerol, diethylene glycol, oligomeric poly(ethylene glycols), polyethers such as octyl phenoxy polyethoxy ethanol, nonylphenyl polyethoxy ethylene glycol and the like. The solvent which is used in the finisher in the solvent phase can be any solvent which is immiscible in the water phase capable of dissolving an oleophilic surfactant and one which will not appreciably dissolve the image areas of the lithographic plate.

In preparing the formulations of the present invention, generally the surfactants and the solvents are mixed together and then mixed with a composition prepared, for example, from tapioca dextrin, acid phosphate salt, glycerin and preservative.

As the tapioca dextrin is not soluble in the petroleum solvent, an emulsion of the two phases is formed by mixing. The stability of the emulsion will depend upon the choice and amount of surfactants contained in the solvent solutions described above.

The compositions of the present invention are particularly useful with lithographic printing plates having coatings which contain diazo salts and 1,2-diazo-naphthoquinone sulfoesters and polymers such as polyvinyl formal (Formvar TM Monsanto Co.) and novolak type phenolic resins. Typical plates which may be processed with the plate finishers of this invention are the ENCO® N-100, N-200 and N-2 Negative-Acting plates and the ENCO® PA-200 Series Positive-Acting plates, products of Azoplate, Division of American Hoechst Corporation. Also processable are the Polychrome DSN, and the "S" and "K" plates of the Minnesota Mining and Manufacturing Company. All these are subtractive plates.

The following examples further illustrate this invention:

EXAMPLE 1

Compositions A and B are prepared having the following formulations:

| | |
|---|---|
| Composition A: | |
| Tapioca Dextrin | 80.0 g |
| Water | 800.0 g |
| Monosodium Phosphate | 50.0 g |
| Glycerin | 10.0 g |
| Givgard DXN (Givaudan) (6 Acetoxy-2,4-dimethyl-m-dioxane) | 1.0 g |
| Composition B: | |
| Amsco 46 TM — a petroleum distillate with a boiling point range of 360° F.-395° F. by procedure ASTM d-86. 29% aromatic above $C_8$; 28% naphthenic components; 43% paraffin (all by weight) American Mineral Spirits, Division of Union Oil Company | 90.0 g |
| Duponol O.S.® | 11.0 g |
| Trycol DA-4 TM, a non-ionic surfactant more sprcifically an ethoxylated decyl alcohol. Trylon Chem., Division of Emery Ind. Inc. | 4.0 g |

Compositions A and B are combined by mixing with stirring and then by homogenizing for one minute using a laboratory model Gifford-Wood Homo-mixer.

An imaged ENCO® N-100 plate which has been developed with a solvent developer to remove the unexposed coating, is water washed and damp dried. It is treated with one-half ounce per square foot of the above composition by wiping the finisher over the entire plate with a cotton pad and then rubbing down to dryness with a pad or cloth. The finished plate is stored for six weeks in a non-air conditioned area at ambient temperatures and then mounted on a press.

The dampening rollers are placed in contact with the plate and after five revolutions the ink rollers are lowered to contact the plate. The image areas immediately accepted ink and the non-image areas repelled the ink. Thousands of clean sharp prints are produced without problems.

N-100® plates similarly prepared were stored at elevated temperatures of 40° C. and 50% relative humidity and at 50° C. and for up to six weeks prior to mounting on the press. All plates inked up quickly and printed sharply with no problems. N-100® plates which were not finished with the above-described composition, but stored at room temperature for three days, scummed after inking on the press.

EXAMPLE 2

ENCO® N-50 and N-100 plates which were imaged through a negative transparency by exposure to a UV light source and developed with a solvent developer to remove the unexposed coating were water washed and dried with air. Sample plates were treated with the following compositions, as in Example 1, and run on the press. All of the plates readily accepted ink in the image areas and printed clean, sharp copies.

| | A | B | C | D | E |
|---|---|---|---|---|---|
| Water | 773 | 797 | 809 | 802 | 767 |
| Tapioca Dextrin | 10 | 20 | 40 | 100 | 150 |
| Monosodium phosphate | 100 | 80 | 60 | 20 | 10 |
| Glycerin | 1 | 2 | 4 | 6 | 15 |
| Amsco 46 | 90 | 80 | 70 | 60 | 50 |
| Duponol O.S. | 15 | 12 | 10 | 8 | 5 |
| Trycol DA 4 | 10 | 8 | 6 | 4 | 2 |
| Givgard DXN | 1 | 1 | 1 | 1 | 1 |

All of the amounts in the above formulations are parts by weight.

EXAMPLE 3

Polychrome DSN, a subtractive aluminum lithographic plate, made by the Polychrome Corporation of New York, was exposed under a negative film transparency, to obtain a solid 6 step on a $\sqrt{2}$ step wedge, using a carbon arc lamp. The plate was developed with a solvent developer which removed the non-photohardened coating. An image corresponding to the transparent portion of the negative film remained on the plate. After rinsing with water, the plate was preserved with the finishing solution of the invention. Plates were stored for several weeks at 40° C. and 60% relative humidity, and subsequently run on a lithographic printing press. The image readily accepted ink and the non-image areas were clean and free of scum.

EXAMPLE 4

The procedure of Example 3 outlined above was repeated using plates from Minnesota, Mining and Manufacturing Co. identified as the Tartan 60, the "S" plate and "K" plate. Plates preserved with finisher were stored and run in the same manner as in Example 3 above. Thousands of clean, sharp prints were obtained.

EXAMPLE 5

KALLE N-7, a negative-acting photopolymer aluminum lithographic plate made by Hoechst AG. of Germany was exposed under a negative film transparency, to obtain a solid 6 step on a $\sqrt{2}$ step wedge, using a Berkey-Ascor 1601-45 exposure unit. The plate was developed with an aqueous alkali developer which removed the non-photohardened coating. An image corresponding to the transparent portion of the negative film remained on the plate. After rinsing with water, the plate was preserved with the finishing solution of the invention. The image readily accepted ink and the non-image areas were clean and free of scum.

A second N-7 plate was exposed and developed as above, but was not rinsed, merely wiped dry. The plate showed very severe scumming upon inking with water and standard plate bench ink. This blackened plate was then rubbed with the finishing solution of the invention, squeegeed dry, treated again with the above finishing solution, wiped dry, and then inked as before, whereupon it inked readily, showing no tendency to blind or scum.

EXAMPLE 6

An imaged ENCO® N-50 plate which was exposed under a negative master to actinic radiation and developed with a solvent developer to remove the unexposed coating, was water washed and damp dried. An application of ENCO® N-2 Plate Preserver was made with a cotton pad and rubbed down dry. The N-2 Plate Preserver contains a water phase composed of gum arabic and water (gum arabic approximately 10 percent by weight) and a solvent phase composed of petroleum solvent (Amsco 46) with a styrene copolymer and Duponol O. S. After one week storage at room temperature, the plate was mounted on a lithographic offset press and wiped with a water dampened sponge. The dampening and ink form rollers were lowered to contact the plate and paper was fed to make printed impressions. Several hundred copies were printed before the image fully accepted ink due to gum blinding.

EXAMPLE 7

A plate was prepared as in Example 6 except for the Western Litho Division of Bemis Corporation product AGE, an emulsion of asphaltum, gum arabic and etching agent was applied as a plate preserver. After one week storage at room temperature, the plate was mounted on the press. Complete inking of the image required several hundred impressions. The image appeared to be blinded by the gum arabic in the AGE.

It will be obvious to those skilled in the art that many modofications may be made within the scope of the present invention without departing from the spirit thereof, and the invention includes all such modifications.

What is claimed is:

1. An emulsion-type lithographic plate finisher comprising a solvent phase including a hydrocarbon petroleum solvent solution of an oleophilic solvent-soluble surfactant, and an aqueous phase including tapioca dextrin, at least one salt which is not severely corrosive to aluminum, and water.

2. A plate finisher according to claim 1 including an emulsifying agent.

3. A plate finisher according to claim 1 in which the oleophilic solvent-soluble surfactant is present in the solvent phase in an amount in the range of about 0.02 to 2 percent by weight.

4. A plate finisher according to claim 1 in which the tapioca dextrin is present in the aqueous phase in an amount in the range of about 0.5 to 30 percent by weight.

5. A plate finisher according to claim 1 in which the solvent phase constitutes about 1 to 20 percent by weight of the total weight of the solvent and water phases.

6. A plate finisher according to claim 1 in which the pH is in the range of about 3 to 5.

7. A plate finisher according to claim 1 including a second surfactant for improving contact between the plate finisher and a hydrophilic substrate.

8. A plate finisher according to claim 1 wherein said salt is selected from the group consisting of sodium nitrate, sodium sulfate, calcium nitrate, magnesium nitrate, magnesium sulfate, sodium phosphate, ammonium phosphate, ammonium nitrate, ammonium sulfate, sodium acetate, and potassium tartrate.

9. A plate finisher according to claim 8 in which the salt is present in the aqueous phase in an amount in the range of about 0.5 to 20 percent by weight.

* * * * *